United States Patent [19]

Littledeer

[11] Patent Number: 4,807,322
[45] Date of Patent: Feb. 28, 1989

[54] AUTOMOBILE WINDSHIELD CLEANING TOOL

[76] Inventor: Tomislav F. Littledeer, 1961 Gertrude Street, Carignan, Quebec, Canada, J3L 4G8

[21] Appl. No.: 44,315

[22] Filed: Apr. 30, 1987

[51] Int. Cl.$^4$ .............................................. A47L 13/16
[52] U.S. Cl. ........................................ 15/121; 15/118; 15/220 R; 15/245; 15/236.02
[58] Field of Search ................ 15/118, 105, 111, 114, 15/117, 210 R, 220 R, 121, 244 R, 244 C

[56] References Cited

U.S. PATENT DOCUMENTS

| | | | |
|---|---|---|---|
| 2,109,626 | 3/1938 | Sowers | 15/121 X |
| 2,155,462 | 4/1939 | Anderson | 15/121 |
| 2,590,977 | 4/1952 | Kay | 15/227 X |
| 2,631,326 | 3/1953 | Smith | 15/121 X |
| 2,663,889 | 12/1953 | Fuglie | 15/121 X |
| 2,682,678 | 7/1954 | Kingman | 15/118 |
| 2,715,745 | 8/1955 | Jacobsen | 15/121 |
| 3,080,687 | 3/1963 | Gross | 15/118 X |
| 3,629,896 | 12/1971 | Sirnec | 15/118 |
| 4,091,491 | 5/1978 | Hoffman | 15/227 |
| 4,506,404 | 3/1985 | Clay | 15/244.3 |
| 4,670,930 | 6/1987 | Lu | 15/118 |

FOREIGN PATENT DOCUMENTS

| | | | |
|---|---|---|---|
| 1100968 | 4/1955 | France | 15/118 |
| 190088 | 6/1937 | Switzerland | 15/118 |
| 1092902 | 11/1967 | United Kingdom | 15/118 |
| 2069327 | 8/1981 | United Kingdom | 15/118 |

Primary Examiner—Chris K. Moore
Attorney, Agent, or Firm—Thomas N. Neiman

[57] ABSTRACT

The cleaning tool has a side of nylon mesh which provides a grate-like surface for the removal of frost or the like off the inner surface of a windshield. The opposite side of the tool has extensions which project from a chamois-like surface. The extensions include a squeegee for removal of moisture and frost dislodged by the mesh and a hard plastic scraper that can remove ice off the external surface of the windshield. The cleaning tool, in an alternate embodiment can be presented in a mitt configuration and may only have a single extension from the chamois-like surface of the tool.

1 Claim, 1 Drawing Sheet

U.S. Patent    Feb. 28, 1989    4,807,322
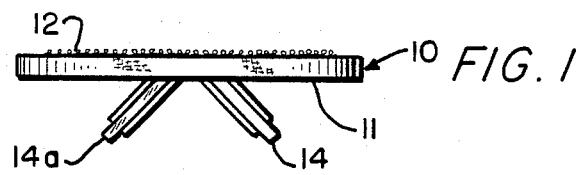
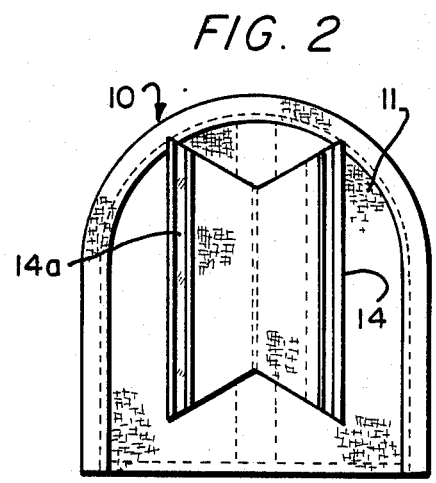
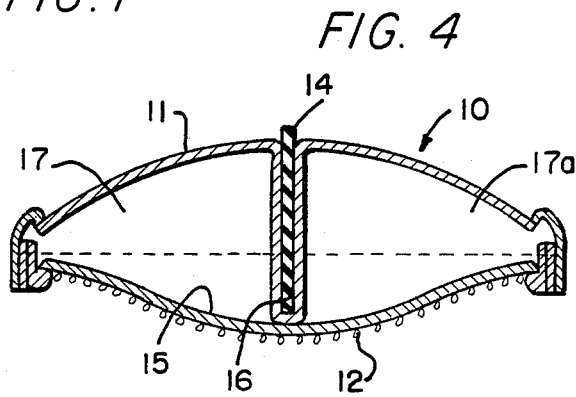
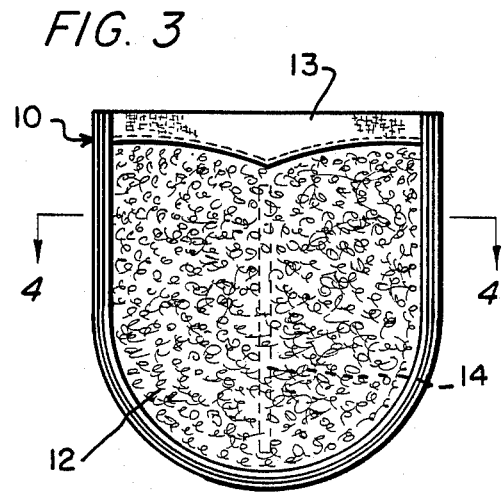
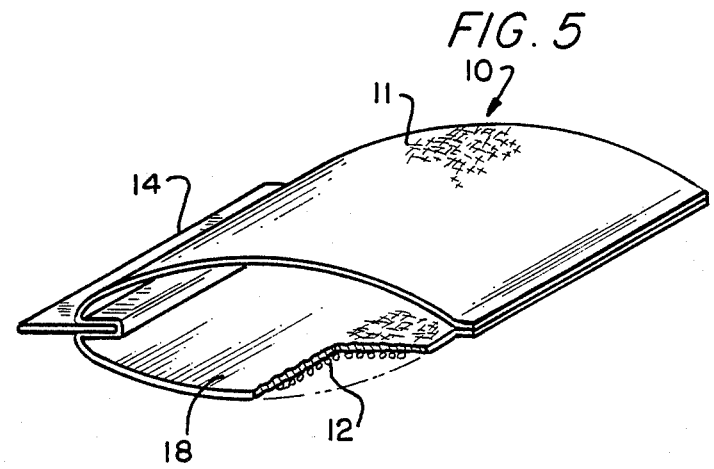
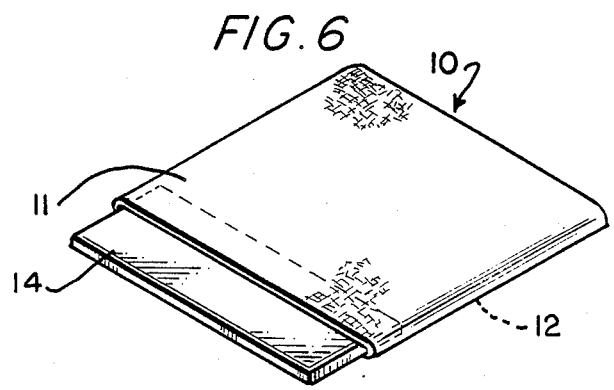

AUTOMOBILE WINDSHIELD CLEANING TOOL

This invention pertains to automobile windshield cleaning devices and in particular to such cleaning devices which have means for providing a plurality of cleaning devices thereof for varying environmental conditions that may present themselves, especially in a northern climate.

Windshield cleaning devices which are known from the prior art, typically have single or, at most, two cleaning surfaces that are sewed or glued together and provide a cleaning and polishing surface. An example of this type of element is the device shown in the Canadian Patent issued to John Tsipis, No. 371,746 on Feb. 1, 1938 which shows in combination a mesh side and a leather or smooth side. This arrangement provides a cleaning surface (mesh) and then a polishing surface. U.S. Pat. No. 3,169,264 issued to Wayne Walker on Feb. 15, 1965 for a Multi-purpose Cleaning and Washing cloth is another example. This device provides an open mesh side and a cotton side, therefore providing a cleaning surface and an absorbent side. What is needed is a more versatile tool which will provide not only cleaning and absorbing qualities, but will also provide the user with the ability to remove heavy frost off the inside or the outside of an automobile windshield and also allow for the removal of hard ice from the interior or exterior surface of the windshield.

It is the object of this invention, then, to set forth an improved automobile windshield cleaning tool which provides multiple-use that can be utilized by the operator of the vehicle. It is a further object of this invention to teach the use of a tool which provides ice removal from the interior and exterior surface of an automobile windshield. It is another object of this invention to teach the use of an automobile windshield cleaning tool which allows the user to remove frost and moisture easily with a choice of means available to accomplish these objectives.

It is an additional object of this invention to teach an automobile windshield cleaning tool, comprising first means for cleaning and removing frost and the like; second means opposite said first means for absorbing the remaining moisture after the frost has been removed; and at least one extension means projecting from said second means.

Further objects of this invention, as well as the novel features thereof, will become more apparent by reference to the following description taken in conjunction with the following figures, in which:

FIG. 1 is a frontal view of the preferred embodiment of the novel automobile windshield cleaning tool;

FIG. 2 is a top view thereof;

FIG. 3 is a bottom view of an alternative embodiment of a mitt version of the novel tool;

FIG. 4 is a cross-sectional view taken along line 4—4 of FIG. 3;

FIG. 5 is a perspective view of a third embodiment of the novel tool; and

FIG. 6 is a perspective view of an additional embodiment of the novel tool.

As shown in the figures, the novel automobile windshield cleaning tool 10 comprises a chamois-like surface 11 and on the side opposite the chamois-like surface 11 is an open mesh surface 12. The tool 10 is formed by stitching or gluing along the peripheral edges of the tool an overlap of the chamois-like surface 11 which has been folded back over itself. It is necessary to cut and sew the open mesh sleeving at the same time during the manufacturing process in order to prevent the unraveling of the weave. An additional, separate piece 13 of the chamois-like surface can also be used for this purpose. The tool 10 has been designed to have at least one projection 14 which is a rubber squeegee that is made to be used to remove moisture from the windshield. In the prime embodiment, shown in FIGS. 1 and 2, a second projection 14a is provided. This projection 14a is made of rigid plastic and provides an ice removal tool for the user and/or automobile owner. The twin projections can be grasped and used as a handle either individually or as a pair. These projections project from the centerline of the tool in the embodiments shown in FIGS. 1, 2, 3 and 4. The positioning of the projections allows the user to have a steady and comfortable platform to work with and minimizes fatigue when cleaning the windshield. Because of the tool's size and flexibility, it is able to reach areas that would be unreachable with normal ice scraping units. In the mitt version of the tool—shown in FIGS. 3 and 4—the projection 14 extends through the chamois-like surface 11 and is anchored against the inner layer 15 of the open weave surface. This forms both a firm support piece and handle 16 to assist grasping and opens divided finger sections 17 and 17a. The projections 14 and 14a in all embodiments are glued to extra pieces of chamois-like fabric attached to the surface 11 or are inserted into folds in that surface. These projections can also be folded over to one side or the other to allow usage of the chamois surface 11.

FIGS. 5 and 6 show alternative embodiments which have the projections 14 located at an edge of the tool 10. Both show a chamois-like surface 11 and an opposite open weave surface 12. FIG. 5 shows a tool 10 with an open center section 18. The tool 10 depicted in FIG. 6 is a single flat unit and is completely enclosed. The projections 14 in either of these embodiments can be the squeegee or the plastic materials.

In practice the novel automobile windshield cleaning tool provides the user a great deal of flexibility in dealing with conditions imposed in winter climates. The tool gives the user the convenience of having the open weave surface acting as as grate to remove frost on the windshield. The rubber squeegee removes moisture and then the chamois-like surface cleans and dries the windshield without the smudging normally associated with cleaning the interior of windshields. In the version that contains the hard plastic extension, removal of solid ice build-up is provided. The tool can also be used with a number of different surfaces such as mirrors or headlights, in addition to the windshield itself. It also has year-round application in removing material from from a variety of surfaces when it is dampened.

While I have described my invention in connection with specific embodiments thereof, it is to be clearly understood that this is done only by way of example and not as a limitation to the scope of my invention as set forth in the objects thereof and in the appended claims.

I claim:

1. An automobile windshield cleaning tool, comprising:

a multiple-sided structure;

first means on one side of said structure for removing frost or the like;

second means on the side opposite said first means for cleaning and absorbing the remaining moisture after the frost has been removed;

at least one projection means for the removal of moisture or the like extending from said second means;

said first means comprises a surface having a rough or coarse texture;

said roughened surface comprises a mesh material having a multitude of looped strands;

said second means comprises a layer of absorbent material;

said absorbent material is attached to said mesh material by means of overlapping said absorbent material over the edges of said mesh material for stitching or the like said overlap of said absorbent material through said mesh material;

said projection means comprises a length of rubber or like material;

said length of material is positioned at the centerline of said second means and traverses substantially the entire length of said second means;

said length of material is attached to said centerline of said second means; and said length of material is connected to said second means by means of adhesive means or the like.

* * * * *